United States Patent
Vijaya Kumar et al.

(10) Patent No.: US 12,325,448 B2
(45) Date of Patent: Jun. 10, 2025

(54) METHOD TO ENHANCE LATERAL ASSIST APPLICATIONS IN THE PRESENCE OF ROAD FEATURES

(71) Applicant: GM Global Technology Operations LLC, Detroit, MI (US)

(72) Inventors: Vivek Vijaya Kumar, Shelby Township, MI (US); Donald K. Grimm, Utica, MI (US); Chuan Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 232 days.

(21) Appl. No.: 18/057,304

(22) Filed: Nov. 21, 2022

(65) Prior Publication Data

US 2024/0166238 A1 May 23, 2024

(51) Int. Cl.
*B60W 60/00* (2020.01)
*B60W 30/09* (2012.01)
*B60W 30/12* (2020.01)
*B60W 50/14* (2020.01)

(52) U.S. Cl.
CPC ........ *B60W 60/0015* (2020.02); *B60W 30/09* (2013.01); *B60W 30/12* (2013.01); *B60W 50/14* (2013.01); *B60W 2552/05* (2020.02); *B60W 2552/10* (2020.02); *B60W 2552/53* (2020.02); *B60W 2754/20* (2020.02)

(58) Field of Classification Search
CPC .. B60W 60/0015; B60W 30/09; B60W 30/12; B60W 50/14; B60W 2552/05; B60W 2552/10; B60W 2552/53; B60W 2754/20; B60W 2520/10; B60W 60/0011
See application file for complete search history.

(56) References Cited

U.S. PATENT DOCUMENTS

| | | | |
|---|---|---|---|
| 2018/0237007 A1* | 8/2018 | Adam | B60W 50/14 |
| 2018/0336782 A1* | 11/2018 | Chase | H01Q 21/28 |
| 2020/0180610 A1* | 6/2020 | Schneider | B60W 40/04 |
| 2021/0253128 A1* | 8/2021 | Nister | B60W 60/0027 |
| 2023/0160713 A1* | 5/2023 | Xu | B60W 60/00184 |
| | | | 701/533 |

FOREIGN PATENT DOCUMENTS

| | | | | |
|---|---|---|---|---|
| CN | 110803161 A | * | 2/2020 | B60W 30/12 |
| DE | 102013019112 A1 | * | 5/2015 | B60W 40/06 |

* cited by examiner

*Primary Examiner* — Anne Marie Antonucci
*Assistant Examiner* — Jewel Ashley Kuntz
(74) *Attorney, Agent, or Firm* — Vivacqua Crane, PLLC (57) ABSTRACT

A method for lateral assist includes receiving work-zone data. The work-zone data includes information about a location of a work zone and a geometry of the work zone. The method further includes determining a route of a vehicle using the work-zone data. Determining the route path of the vehicle includes selecting a lane segment using the work-zone data. The lane segment is adjacent to the work zone. Determining the route path further includes determining a lane departure tolerance for the lane segment previously selected using the work-zone data. The method further includes commanding the vehicle to move within the lane departure tolerance along the lane segment previously selected.

9 Claims, 4 Drawing Sheets

METHOD TO ENHANCE LATERAL ASSIST APPLICATIONS IN THE PRESENCE OF ROAD FEATURES

INTRODUCTION

The present disclosure relates to systems and methods vehicle motion control and, more particularly, to systems and methods to enhance lateral assist applications in the presence of road features.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Lateral assist applications include lane centering assist (LCA), lane keeping assist (LKA), and lane departure warning. LKA warns drivers who encroach into an adjacent lane based on a lane departure threshold, ensuring that the vehicle travels within its own lane. LCA uses a centerline of a lane to facilitate automatic lane following. In some circumstances, the lane centerline and/or the lane departure threshold should be adjusted to account for physical objects that may obstruct the path along the road. It is therefore desirable to develop methods and systems that can adjust the lane centerline and/or the lane departure threshold to account for road features, such as work zones.

SUMMARY

The present disclosure describes a method for lateral assist. In an aspect of the present disclosure, the method includes receiving work-zone data. The work-zone data includes information about a location of a work zone and a geometry of the work zone. The method further includes determining a route of a vehicle using the work-zone data. Determining the route path of the vehicle includes selecting a lane segment using the work-zone data. The lane segment is adjacent to the work zone. Determining the route path further includes determining a lane departure tolerance for the lane segment previously selected using the work-zone data. The method further includes commanding the vehicle to move within the lane departure tolerance along the lane segment previously selected. The method described in this paragraph improves vehicle technology by adjusting the lane departure tolerance of a vehicle when a road feature, such as a work zone, is located along the route of the vehicle.

In an aspect of the present disclosure, the lane segment defines a lane centerline extending along a center of the of the lane segment. The lane segment may be directly adjacent to the work zone. The lane departure tolerance is less than a width of the lane segment. The lane departure tolerance is laterally offset relative to the lane centerline extending along the center of the lane segment.

In an aspect of the present disclosure, the lane segment is a selected lane segment. The selected lane segment is part of a plurality of lane segments. A plurality of lanes is adjacent to the work zone. Determining the route path of the vehicle includes virtually dividing the plurality of lanes into the plurality of lane segments and assigning a score to each of the plurality of lane segments to generate a plurality of lane-segment scores corresponding to each of the plurality of lane segments.

In an aspect of the present disclosure, determining the route path of the vehicle includes identifying a plurality of possible paths around the work zone. The plurality of possible paths includes a plurality of lane segment maneuvers. Determining the route path of the vehicle includes assigning a score to each of the plurality of lane segment maneuvers to generate a plurality of maneuver scores for each of the plurality of lane segment maneuvers.

In an aspect of the present disclosure, determining the route path of the vehicle includes adding the plurality of lane-segment scores and the plurality of maneuver scores for each of the plurality of possible paths around the work zone to generate a total score for each of the plurality of possible paths around the work zone.

In an aspect of the present disclosure, determining the route path of the vehicle includes determining which of the plurality of possible paths has the total score that is largest. An optimum path is a path of the plurality of possible paths that has a largest total score. The method further includes selecting optimum path and commanding the vehicle to move autonomously along the optimum path and/or informing the driver to make a lane change.

In an aspect of the present disclosure, determining the route path of the vehicle includes selecting an optimum path as a function of a lane width of each of the plurality of lanes, a speed of the vehicle, and a width of the vehicle; and commanding the vehicle to move autonomously along the optimum path and/or informing the drive to make a lane change.

In an aspect of the present disclosure, a method for lane assist includes receiving work-zone data. The work-zone data includes information about a location of a work zone and a geometry of the work zone. The method further includes determining a route of a vehicle using the work-zone data. Determining the route path of the vehicle includes selecting a lane segment using the work-zone data. The lane segment is adjacent to the work zone. The method further includes determining a lane departure tolerance for the lane segment previously selected using the work-zone data and monitoring a position of the vehicle within the lane segment to determine whether the vehicle is positioned within the lane departure tolerance. The method further includes commanding the vehicle to provide an alert in response to determining that the vehicle is not positioned within the lane departure tolerance. The method further includes commanding the vehicle to move within the lane departure tolerance along the lane segment previously selected. The method described in this paragraph improves vehicle technology by adjusting the lane departure tolerance of a vehicle when a road feature, such as a work zone, is located along the route of the vehicle.

In an aspect of the present disclosure, the lane segment is a selected lane segment, the selected lane segment is part of a plurality of lane segments. A plurality of lanes is adjacent to the work zone. Determining the lane departure tolerance for the lane segment previously selected using the work-zone data includes dividing the plurality of lanes into the plurality of lane segments and assigning a score to each of the plurality of lane segments based on whether a corresponding lane segment of the plurality of lane segment is closed and whether a worker is present in the corresponding lane segment.

In an aspect of the present disclosure, the method further includes determining the lane departure tolerance for each of the plurality of lane segments based on the score corresponding to each of the plurality of lane segments.

The present disclosure also describes a tangible, non-transitory, machine-readable medium, including machine-readable instructions, that when executed by one or more processors, cause one or more processors to execute the methods described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps.

Figure 1:
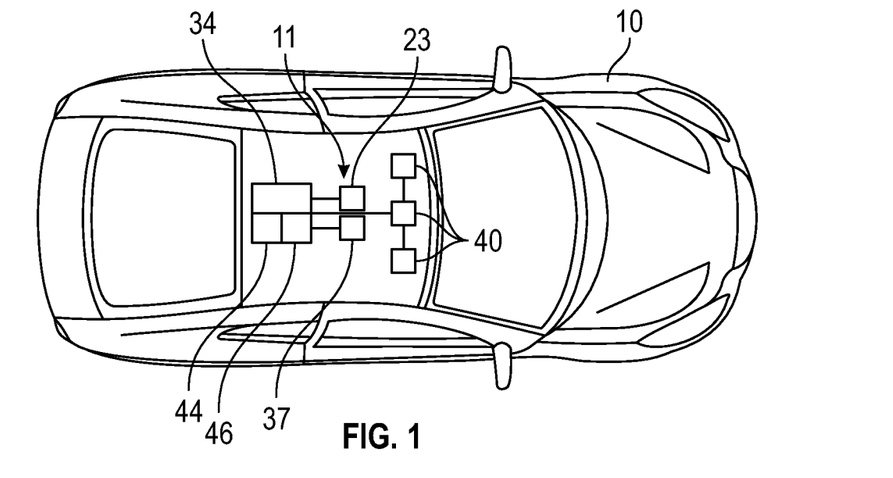
FIG. 1 is a schematic diagram of a vehicle including a system for enhancing lateral assist application in the presence of road features.

With reference to FIG. 1, a vehicle 10 includes (or is in communication with) a system 11 to enhance lateral assist applications in the presence of road features. While the system 11 is shown inside the vehicle 10, it is contemplated that the system 11 may be outside of the vehicle 10. As a non-limiting example, the system 11 may be a cloud-based system in wireless communication with the vehicle 10. Although the vehicle 10 is shown as a sedan, it is envisioned that that vehicle 10 may be another type of vehicle, such as a pickup truck, a coupe, a sport utility vehicle (SUVs), a recreational vehicle (RVs), etc. The vehicle 10 may be an autonomous vehicle configured to drive autonomously.

The vehicle 10 includes a controller 34 and one or more sensors 40 in communication with the controller 34. The sensors 40 collect information and generate sensor data indicative of the collected information. As non-limiting examples, the sensors 40 may include Global Navigation Satellite System (GNSS) transceivers or receivers, yaw rate sensors, speed sensors, lidars, radars, ultrasonic sensors, and cameras, among others. The GNSS transceivers or receivers are configured to detect the location of the vehicle 10 in the globe. The speed sensors are configured to detect the speed of the vehicle 10. The yaw rate sensors are configured to determine the heading of the vehicle 10. The cameras may have a field of view large enough to capture images in front, in the rear, and in the sides of the vehicle 10. The ultrasonic sensor may detect dynamic objects.

The system 11 further includes a controller 34 in communication with the sensors 40. The controller 34 includes at least one processor 44 and a non-transitory computer readable storage device or media 46. The processor 44 may be a custom-made processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

Figure 4:
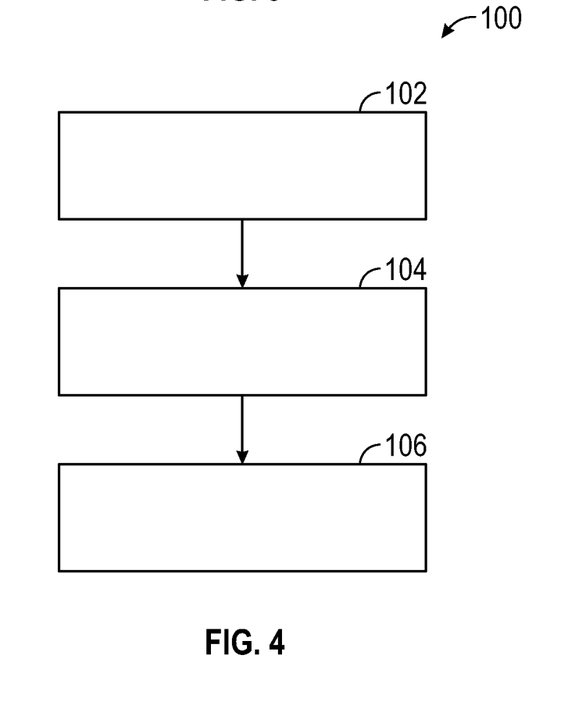
FIG. 4 is a flowchart of a method to enhance lateral assist applications in the presence of road features.

The instructions may include one or more separate programs, each of which comprises an ordered listing of executable instructions for implementing logical functions. The instructions, when executed by the processor 44, receive and process signals from the cameras, perform logic, calculations, methods and/or algorithms for automatically controlling the components of the vehicle 10, and generate control signals to the actuators to automatically control the components of the vehicle 10 based on the logic, calculations, methods, and/or algorithms. Although a single controller 34 is shown in FIG. 1, the system 11 may include a plurality of controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the controller 34 are embodied in the system 11. The non-transitory computer readable storage device or media 46 includes machine-readable instructions (shown, for example, in FIG. 4), that when executed by the one or more processors, cause the processors 44 to execute the method 100 (FIG. 4).

The vehicle 10 includes a user interface 23 in communication with the controller 34. The user interface 23 may be, for example, a touchscreen in the dashboard and may include, but is not limited to, an alarm, such as one or more speakers to provide an audible sound, haptic feedback in a vehicle seat or other object, one or more displays, one or more microphones, one or more lights, and/or other devices suitable to provide a notification or alert to the vehicle user of the vehicle 10. The user interface 23 is in electronic communication with the controller 34 and is configured to receive inputs from a vehicle user (e.g., a vehicle user or a vehicle passenger). For example, the user interface 23 may include a touch screen and/or buttons configured to receive inputs from a vehicle user. Accordingly, the controller 34 is configured to receive inputs from the vehicle user via the user interface 23 and to provide an output (i.e., an alert) to the vehicle user.

The vehicle 10 may include one or more communication transceivers 37 in communication with the controller 34. Each of the communication transceivers 37 is configured to wirelessly communicate information to and from other remote entities, such as the remote vehicles, (through "V2V" communication), infrastructure (through "V2I" communication), remote systems at a remote call center (e.g., ON-STAR by GENERAL MOTORS, and/or personal electronic devices, such as a smart phone. The communication transceivers 37 may be configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication transceivers 37 may include one or more antennas for receiving and/or transmitting signals, such as cooperative sensing messages (CSMs). The communication transceivers 37 may be considered sensors 40 and/or sources of data. The remote vehicles may include one or more communication transceivers 37 as described above with respect to the vehicle 10.

Figure 2:
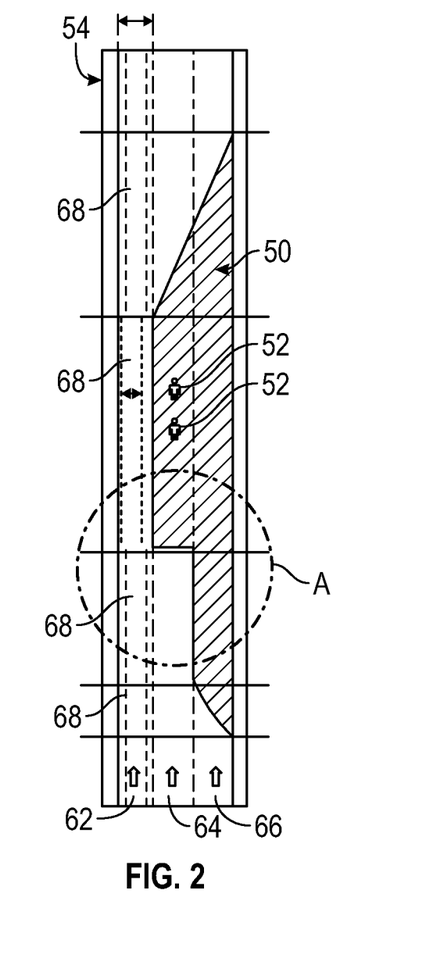
FIG. 2 is a schematic diagram of a road including a work zone.
Figure 3:
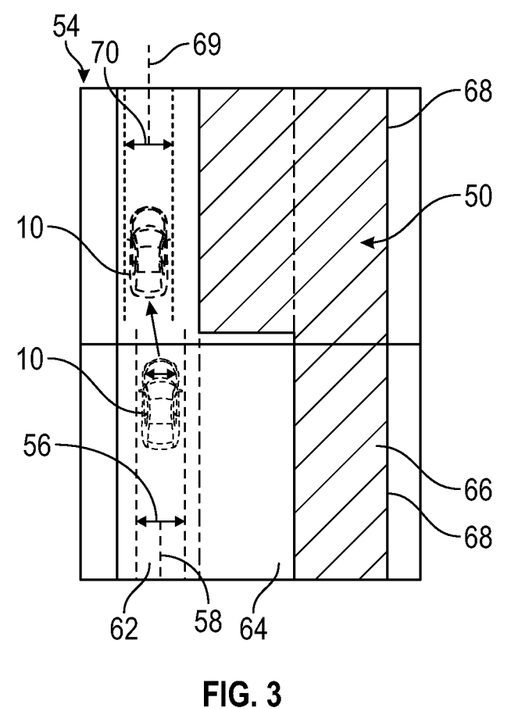
FIG. 3 is a schematic diagram of the road of FIG. 2, taken around area A.

With reference to FIGS. 1, 2, and 3, the system 11 is configured to enhance lateral assist applications, such as lane centering assist (LCA), lane keeping assist (LKA), and lane departure warning. LKA warns drivers who encroach into an adjacent lane based on a lane departure threshold 56, ensuring that the vehicle travels within its own lane. LCA uses a lane centerline 58 of a lane to facilitate automatic lane following. In some circumstances, the lane centerline 58 and/or the lane departure threshold 56 should be adjusted to account for physical objects along the road 54. To adjust the lane centerline 58 and/or the lane departure threshold 56, the system 11 detects a road feature, such as a work zone 50 (e.g., narrow lane regions, the presence of workers 52, etc.) and/or other driving scenarios (e.g., parked vehicles, poor quality lane edge, etc.) along the route path of the vehicle 10. In response to detecting one or more road features, the system 11 adjusts the behavior of one or more lateral assist applications (e.g., LKA, LCA, etc.). As a non-limiting example, the controller 34 receives road data from the sensors 40, work zone data exchange (WZDx) communications, V2V communications, and/or V2I communications. The road data is information about one or more road features (e.g., work zone 50) of the road 54 along the route path of the vehicle 10. The road data may include work-zone data. In the present disclosure, the term "work-zone data" means information the work zone 50 including, but not limited to, the location of the work zone 50, the geometry of the work zone 50, and the presence of workers 52 in the work zone 50. The system 11 combines the vehicle position, vehicle dynamics, lane geometry, and work-zone data to adjust lane centerline 58 and/or the lane departure threshold 56 as a function of the reduced lane width, the location of the work zone 50 relative to the vehicle 10, and/or the location one or more workers 52 relative to the vehicle 10. Therefore, the system 11 may adjust the initial lane centerline 58 to an adjusted lane centerline 69 based on the reduced lane width, the location of the work zone 50 relative to the vehicle 10, and/or the location one or more workers 52 relative to the vehicle 10. The adjusted lane centerline 69 is laterally offset relative to the initial lane centerline 58. Similarly, the system 11 may adjust the initial lane departure threshold 56 to an adjusted lane departure tolerance 70. The adjusted lane departure tolerance 70 is laterally offset relative to the initial lane departure threshold 56. Further, the adjusted lane departure tolerance 70 is laterally offset relative to the initial lane centerline 58. In other words, the centerline of the adjusted lane departure tolerance 70 is not aligned with the initial lane centerline 58. The adjusted lane departure tolerance 70 is less than the width of the lane segment 68. The system 11 performs lane centering using dynamic parameters for the work zone 50. Further, the system 11 may use crowdsourcing to adjust the lane following behavior of the vehicle 10. The road 54 includes a first lane 62, a second lane 64, and a third lane 66. Each of the first lane 62, the second lane 64, and the third lane 66 may be divided into lane segments 68.

FIG. 4 is a flowchart of a method 100 to enhance lateral assist applications in the presence of road features. The method 100 begins at block 102. At block 102, the controller 34 receives road data from the sensors 40, work zone data exchange (WZDx) communications, V2V communications, and/or V2I communications. In the present disclosure, the term "road data" means information about road features (e.g., work zone 50, parked vehicles, etc.) along the route path of the vehicle 10. The road data may include work-zone data. Therefore, the controller 34 may receive work-zone data at block 102. In the present disclosure, the term "work-zone data" means information the work zone 50 including, but not limited to, the location of the work zone 50, the geometry of the work zone 50, and the presence of workers 52 in the work zone 50. The work-zone data may additionally include information about the start of the work zone 50 and the lane closures. The work-zone data may be obtained from sensors 40, V2I communications, V2V communications, crowdsourcing from other vehicles or other objects, high speed vehicle telemetry, etc. The method 100 then continues to block 104.

At block 104, the controller 34 plans the route around the work zone 50 based, among other things, on geometry of the work zone 50, the starting point of the work zone 50, the end point of the work zone 50, etc. Specifically, at block 104, the controller 34 selects a lane (e.g., the first lane 62, the second lane 64, and the third lane 66) and a lane segment 68 within the selected lane based, for example, on the work-zone data. As non-limiting examples, the controller 34 may select a lane based, among other things, on the location of the work zone 50, the presence of workers 52, the width of one or more lanes, the road condition (e.g., the presence of a pothole), the presence of stopped vehicles, and/or the location and size of the shoulder area. Next, the method 100 continues to block 106.

At block 106, the controller 34 determines the adjusted lane departure tolerance 70 and/or the adjusted lane centerline 69 using, for example, the work-zone data. As non-limiting examples, the controller 34 may determine the adjusted lane departure tolerance 70 and/or the adjusted lane centerline 69 based on the location of the work zone 50, the presence of workers 52, the width of one or more lanes, and/or the presence of stopped vehicles.

Figure 5:
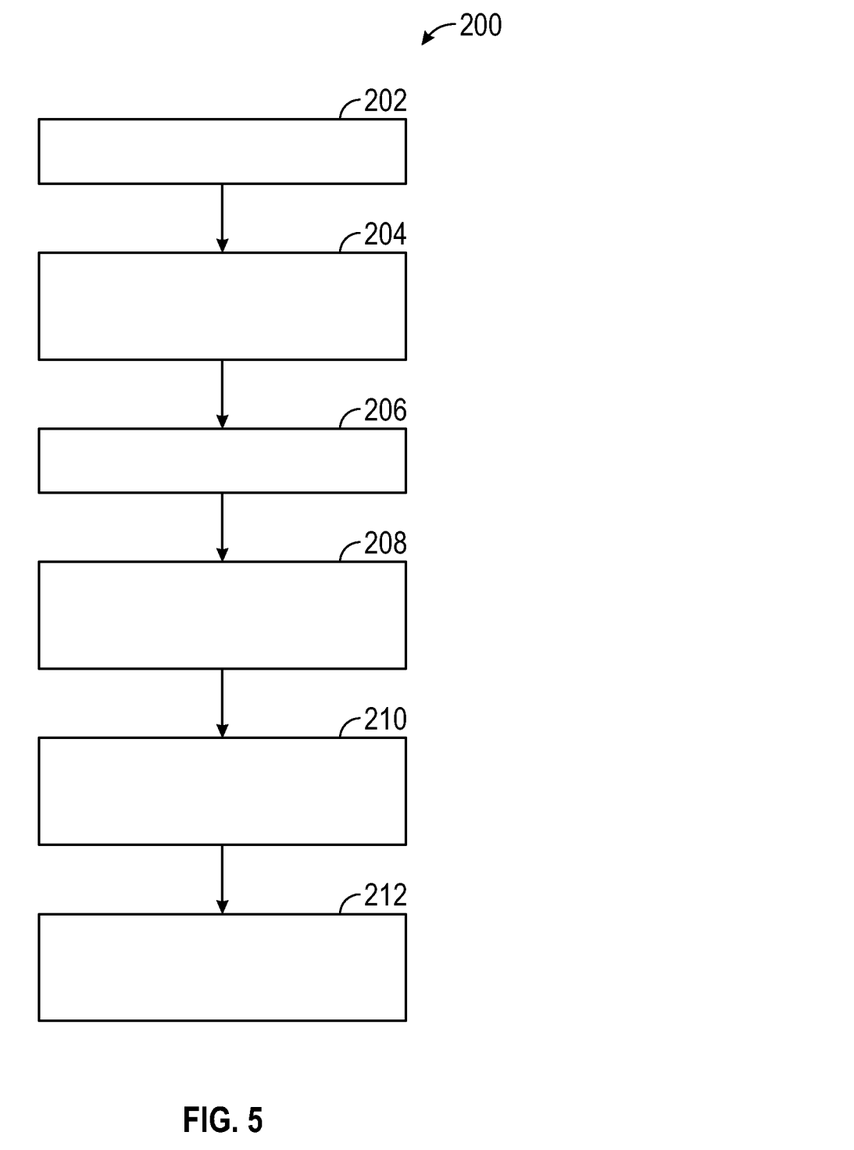
FIG. 5 is a process for selecting a route path.

FIG. 5 is a process 200 for determining a path along the work zone 50 using the work-zone data. The process 200 begins at block 202. At block 202, the controller 34 virtually divides the lanes (e.g., the first lane 62, the second lane 64, and the third lane 66) into lane segments 68. Then, the process 200 continues to block 204.

At block 204, controller 34 assigns a score to each lane segment 68 to generate a plurality of lane-segment scores corresponding to each of the plurality of lane segments 68. The assigned lane-segment scores may be based on the work-zone data. For example, if a lane segment 68 in the first lane 62 is completely closed due to the work zone 50, then that lane segment 68 is assigned a negative score, such as negative ten. In another example, if workers 52 are present in a lane segment 68 of the second lane 64, then that lane segment 68 is assigned a negative score, such as negative one. For example, if a lane segment 68 in the second lane 64 is partially closed due to the work zone 50, then that lane segment 68 is assigned a negative score, such as negative one. For instance, if a lane segment 68 is not closed, then that lane segment 68 is assigned a score of zero. For example, if a lane segment 68 is directly adjacent to a closed lane due to the work zone 50, then that lane segment 68 is assigned a score of negative one. For example, if there is no shoulder adjacent to a lane segment 68, then that lane segment 68 is assigned a score of negative one. In another example, if the lane segment 68 is part of a narrow road, then that lane segment 68 is assigned a score of negative one. Then, the process 200 proceeds to block 206.

At block 206, the controller 34 identifies a plurality of possible paths around the work zone 50. Each of the possible paths includes one or more lane segment maneuvers. Each lane segment maneuver corresponds to a vehicle maneuver when the vehicle 10 follows one of the possible paths in a particular lane segment 68. As a non-limiting example, the lane segment maneuvers may be a lane change. Then, the process 200 continues to block 208.

At block 208, the controller 34 assigns a score to each of the lane segment maneuvers to generate a plurality of maneuver scores for each of the lane segment maneuvers. For example, if the lane segment maneuver is a lane change, then the maneuver score may be negative one. Then, the process 200 proceeds to block 210.

At block 210, the controller 34 adds the lane-segment scores and the maneuver scores for each of the plurality of possible paths around the work zone 50 to generate a total score for each of the plurality of possible paths around the work zone 50. Specifically, if a possible path requires a lane segment maneuver and crosses a particular lane segment 68, then the maneuver score of the required lane segment maneuver is added to the lane-segment score corresponding to the lane segment 48 that the possible path crosses. The possible path may involve various lane segment maneuver and may cross more than one lane segment. In such a case, the multiple maneuver score and lane-segment scores are added to determine the total score for that possible path around the work zone 50. Then, the process 200 continues to block 212.

At block 212, the controller 34 determines which of the plurality of possible paths has the highest total score. The optimum path is the possible path with the largest total score. The controller 34 then selects the optimum path. Additionally, the controller 34 may command the vehicle 10 to autonomously move along the optimum path.

It may be desirable to optimally distribute the vehicle 10 around the work zone 50 in order to minimize the number of lane changes. To do so, the controller 34 considers a host lane width, a vehicle width, a lane segment speed, and a vehicle speed. The lane segment speed is the speed of the vehicle in a particular lane and may be derived from the high speed vehicle telemetry. The vehicle location and heading is obtained from the high speed vehicle telemetry, which has a high frequency (e.g., every 3 seconds). The lane width may be obtained using the sensors 40 or via crowdsourcing. To minimize the number of lane changes, the controller 34 considers certain constraints defined by the following equations:

$$W_{hl} \geq W_{hv} \qquad \text{Eq. 1.}$$

$$\max\{v_{i,j}\} - v_0 \leq v' \qquad \text{Eq. 2}$$

$$\text{Prob}(I_{hl}, l_{target}, d) \geq \theta \qquad \text{Eq. 3}$$

where:
$W_{hl}$ is the host lane width;
$W_{hv}$ is the vehicle width;
$I_{hl}$ is a host lane index;
$v_{i,j}$ is the lane segment speed;
$v_0$ is the vehicle speed;
$v'$ is a speed threshold;
$\text{Prob}(I_{hl}, l_{target}, d)$ is the probability that the lane change is possible;
$I_{hl}$ is a host lane index;
$l_{target}$ is a target lane; and
d is the distance from the current location of the vehicle 10 to the starting location of the target lane segment where the vehicle 10 needs to change lane to its target lane, following the calculated optimal route.

As a non-limiting example, the probability that a lane change is possible is determined using a method described U.S. patent application Ser. No. 18/045,250, filed Nov. 10, 2022. Also, the optimization problem is easy to solve once the probability that a lane change is possible is determined. Brutal-force solutions that are not computation-heavy may also be used to solve the optimization problem.

Figure 6:
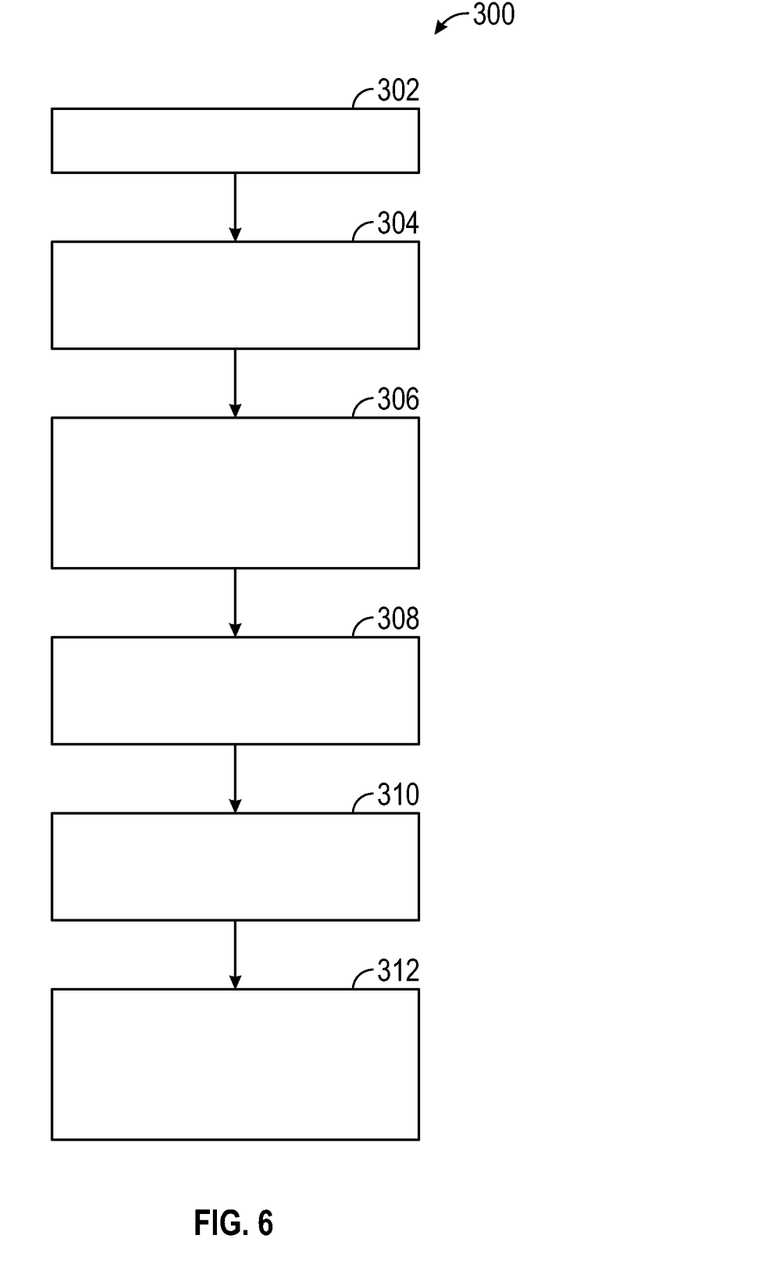
FIG. 6 is a process for notifying drives about a change in the lane departure tolerance.

FIG. 6 is a process 300 for notifying drivers about a change in the lane departure threshold 56. The process 300 begins at block 302. At block 302, the controller 34 receives road data from the sensors 40, work zone data exchange (WZDx) communications, V2V communications, and/or V2I communications. The road data may include work-zone data. Therefore, the controller 34 may receive work-zone data at block 302. In the present disclosure, the term "work-zone data" means information the work zone 50 including, but not limited to, the location of the work zone 50, the geometry of the work zone 50, and the presence of workers 52 in the work zone 50. The work-zone data may additionally include about the start of the work zone 50 and the lane closure. The work-zone data may be obtained from sensors 40i, V2I communications, V2V communications, crowdsourcing from other vehicles or other objects, high speed vehicle telemetry, etc. The process 300 then continues to block 304.

At block 304, controller 34 assigns a score to each lane segment 68 to generate a plurality of lane-segment scores corresponding to each of the plurality of lane segments 68. The assigned lane-segment scores may be based on the work-zone data. For example, if a lane segment 68 in the first lane 62 is completely closed due to the work zone 50, then that lane segment 68 is assigned a negative score, such as negative ten. In another example, if workers 52 are present in a lane segment 68 of the second lane 4 6, then that lane segment 68 is assigned a negative score, such as negative one. For example, if a lane segment 68 in the second lane 64 is partially closed due to the work zone 50, then that lane segment 68 is assigned a negative score, such as negative one. For instance, if a lane segment 68 is not closed, then that lane segment 68 is assigned a score of zero. For example, if a lane segment 68 is directly adjacent to a closed lane due to the work zone 50, then that lane segment 68 is assigned a score of negative one. For example, if there is no shoulder adjacent to a lane segment 68, then that lane segment 68 is assigned a score of negative one. In another example, if the lane segment 68 is part of a narrow road, then that lane segment 68 is assigned a score of negative one. Then, the process 300 proceeds to block 306.

At block 306, the controller 34 maps each of the score determined in block 304 to a change in lane departure threshold 56. Thus, each change in lane departure threshold 56 is assigned a score for each lane segment. Then, the process 300 continues to block 308.

At block 308, the controller 34 determines (e.g., computes) the final lane departure threshold by adding the lane-segment scores determined in block 304 to the scores for the change in lane departure threshold 56. Then, the process 300 continues to block 310.

At block 310, the controller 34 applies the adjusted lane departure tolerance 70. Further, the controller 34 monitors the position of the vehicle 10 within the lane segment 68 to determine whether the vehicle 10 is positioned within or outside the adjusted lane departure tolerance 70. Then, the process 300 continues to block 312.

At block 312, the controller 34 commands the vehicle 10 to provide an alert via the user interface 23 in response to determining that the vehicle 10 is not positioned within the adjusted lane departure tolerance 70. Additionally, the controller 34 may command the vehicle 10 to move to a location within the adjusted lane departure tolerance 70 in response to determining that the vehicle 10 is not positioned within the adjusted lane departure tolerance 70.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for lateral assist in an autonomously controlled vehicle, the method comprising:
   receiving work-zone data, wherein the work-zone data includes information about a location of a work zone and a geometry of the work zone;
   determining a route path of a vehicle using the work-zone data, wherein determining the route path of the vehicle includes:
   virtually dividing a plurality of lanes adjacent the work zone into a plurality of lane segments, wherein the plurality of lanes are defined by the location of the work zone and the geometry of the work zone;
   assigning a score to each of the plurality of lane segments to generate a plurality of lane-segment scores corresponding to each of the plurality of lane segments;
   identifying a plurality of possible paths around the work zone, wherein the plurality of possible paths include a plurality of lane segment maneuvers;

assigning a score to each of the plurality of lane segment maneuvers to generate a plurality of maneuver scores for each of the plurality of lane segment maneuvers;

adding the plurality of lane-segment scores and the plurality of maneuver scores for each of the plurality of possible paths around the work zone to generate a total score for each of the plurality of possible paths around the work zone;

minimizing a number of the lane segment maneuvers using the following constraint equations:

$$W_{hl} \geq W_{hv} \qquad \text{Eq. 1}$$

$$\max\{v_{ij}\} - v_0 \leq v' \qquad \text{Eq. 2}$$

$$\text{Prob}(I_{hl}, l_{target}, d) \geq \theta \qquad \text{Eq. 3}$$

wherein $W_{hl}$ is a host lane width; $W_{hv}$ is a vehicle width; $I_{hl}$ is a host lane index; $v_{ij}$ is a lane segment speed: $v_0$ is a vehicle speed: v' is a speed threshold; $\text{Prob}(I_{hl}, l_{target}, d)$ is a probability that the lane change is possible; $I_{hl}$ is a host lane index; $l_{target}$ is a target lane; and d is a distance from a current location of the vehicle to a starting location of a target lane segment where the vehicle needs to change lane to the target lane, following the possible path;

selecting the route path from whichever of the possible paths has the highest score, optimized by the constraint equations;

determining a lane departure tolerance for the route path using the work-zone data; and commanding the vehicle to autonomously move within the lane departure tolerance along the route path.

2. The method of claim 1, wherein the plurality of lane segment each defines a lane centerline extending along a center of a lane segment, the lane departure tolerance is less than a width of the lane segment, and the lane departure tolerance is laterally offset relative to the lane centerline extending along the center of the lane segment.

3. The method of claim 1, wherein assigning the score to each of the plurality of lane segments is based on whether a corresponding lane segment of the plurality of lane segments is closed and whether a worker is present in the corresponding lane segment.

4. The method of claim 3, further comprising determining the lane departure tolerance for each of the plurality of lane segments based on the score corresponding to each of the plurality of lane segments.

5. A tangible, non-transitory, machine-readable medium, comprising machine-readable instructions, that when executed by a processor, cause the processor to:

receive work-zone data, wherein the work-zone data includes information about a location of a work zone and a geometry of the work zone;

determine a route path of a vehicle using the work-zone data, wherein determining the route path of the vehicle includes:

virtually dividing a plurality of lanes adjacent the work zone into a plurality of lane segments, wherein the plurality of lanes are defined by the location of the work zone and the geometry of the work zone;

assigning a score to each of the plurality of lane segments to generate a plurality of lane-segment scores corresponding to each of the plurality of lane segments;

identifying a plurality of possible paths around the work zone, wherein the plurality of possible paths include a plurality of lane segment maneuvers;

assigning a score to each of the plurality of lane segment maneuvers to generate a plurality of maneuver scores for each of the plurality of lane segment maneuvers;

adding the plurality of lane-segment scores and the plurality of maneuver scores for each of the plurality of possible paths around the work zone to generate a total score for each of the plurality of possible paths around the work zone;

minimizing a number of the lane segment maneuvers using the following constraint equations:

$$W_{hl} \geq W_{hv} \qquad \text{Eq. 1}$$

$$\max\{v_{ij}\} - v_0 \leq v' \qquad \text{Eq. 2}$$

$$\text{Prob}(I_{hl}, l_{target}, d) \geq \theta \qquad \text{Eq. 3}$$

wherein $W_{hl}$ is a host lane width; $W_{hv}$ is a vehicle width; $I_{hl}$ is a host lane index; $v_{ij}$ is a lane segment speed; $v_0$ is a vehicle speed; v' is a speed threshold; $\text{Prob}(I_{hl}, l_{target}, d)$ is a probability that the lane change is possible; $I_{hl}$ is a host lane index; $l_{target}$ is a target lane; and d is a distance from a current location of the vehicle to a starting location of a target lane segment where the vehicle needs to change lane to the target lane, following the possible path;

selecting the route path from whichever of the possible paths has the highest score, optimized by the constraint equations;

determining a lane departure tolerance for the route path using the work-zone data; and command the vehicle to autonomously move within the lane departure tolerance along the route path.

6. The tangible, non-transitory, machine-readable medium of claim 5, wherein the plurality of lane segment each defines a lane centerline extending along a center of a lane segment, the lane departure tolerance is less than a width of the lane segment, and the lane departure tolerance is laterally offset relative to the lane centerline extending along the center of the lane segment.

7. The tangible, non-transitory, machine-readable medium of claim 6, wherein the tangible, non-transitory, machine-readable medium, further comprising machine-readable instructions, that when executed by the processor, causes the processor to:

monitor a position of the vehicle within the lane segment to determine whether the vehicle is positioned within the lane departure tolerance; and command the vehicle to provide an alert in response to determining that the vehicle is not positioned within the lane departure tolerance.

8. The tangible, non-transitory, machine-readable medium of claim 7, wherein the tangible, non-transitory, machine-readable medium, further comprising machine-readable instructions, that when executed by the processor, causes the processor to:

assign a score to each of the plurality of lane segments based on whether a corresponding lane segment of the plurality of lane segments is closed and whether a worker is present in the corresponding lane segment.

9. The tangible, non-transitory, machine-readable medium of claim 7, wherein the tangible, non-transitory, machine-readable medium, further comprising machine-readable instructions, that when executed by the processor, causes the processor to:

determine the lane departure tolerance for each of the plurality of lane segments based on the score corresponding to each of the plurality of lane segments.

\* \* \* \* \*